(No Model.)

W. GRAU.
CANDLE HOLDER FOR CHRISTMAS TREES.

No. 493,161. Patented Mar. 7, 1893.

Witnesses:
P. K. Goodwin
R. Schleicher

Inventor:
William Grau
by his Attorneys
Howson & Howson

UNITED STATES PATENT OFFICE.

WILLIAM GRAU, OF PHILADELPHIA, PENNSYLVANIA.

CANDLE-HOLDER FOR CHRISTMAS-TREES.

SPECIFICATION forming part of Letters Patent No. 493,161, dated March 7, 1893.

Application filed July 2, 1892. Serial No. 438,775. (No model.)

*To all whom it may concern:*

Be it known that I, WILLIAM GRAU, a citizen of the United States, and a resident of Philadelphia, Pennsylvania, have invented an Improved Candle-Holder for Christmas-Trees, of which the following is a specification.

The object of my invention is to construct a candle holder for Christmas trees which can be readily attached to or detached from the trunk of a tree, and which will be rigid after adjustment. This object I attain in the following manner, reference being had to the accompanying drawings, in which—

Figure 1:
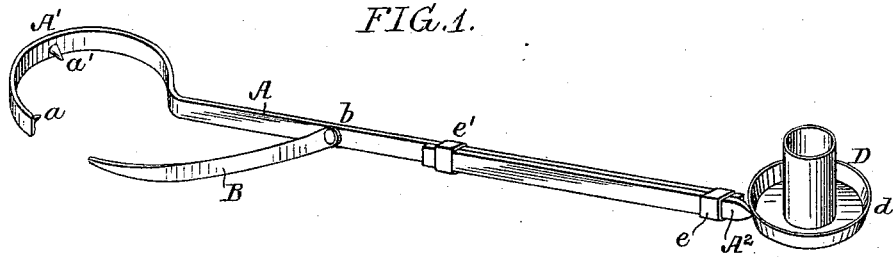
Figure 2:
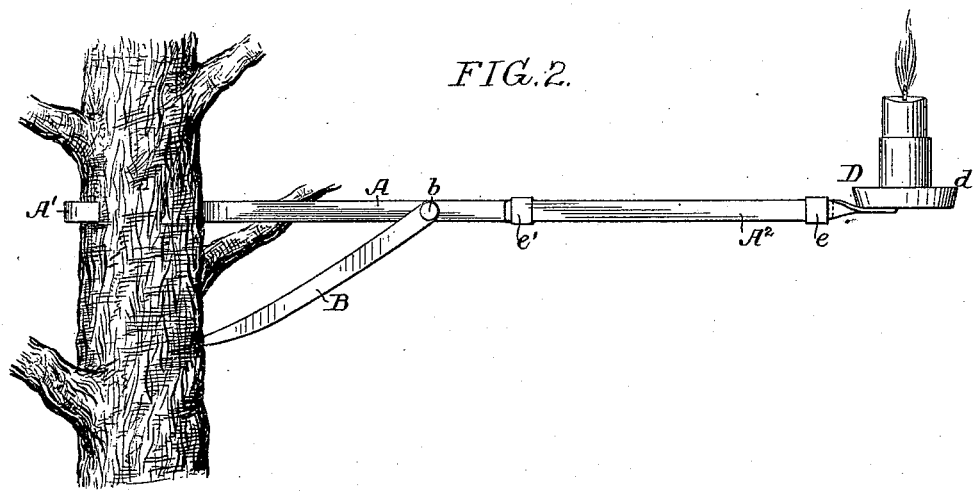
Figure 3:
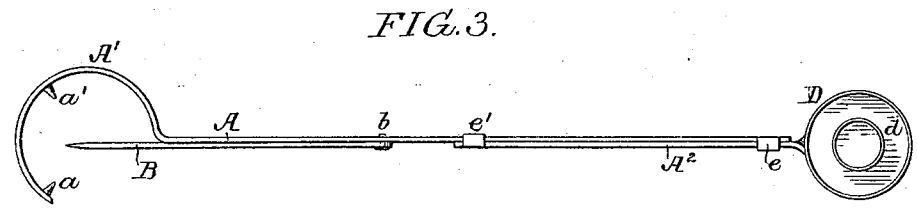
Figure 4:
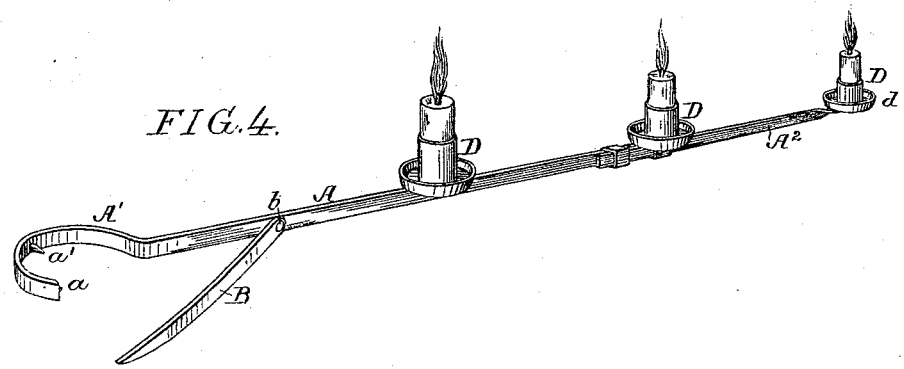

Figure 1, is a perspective view of my improved candle holder for Christmas trees. Fig. 2, is a side view showing the holder attached to a tree. Fig. 3, is a plan view; and Fig. 4, is a perspective view illustrating a modification of my invention.

The common practice in lighting Christmas trees has been to use a reflecting lamp independent of the tree, or to use candle sticks mounted upon the branches of the tree.

My improved candle holder can be readily attached to or detached from the trunk of a tree, and can be extended to any point desired, so as to avoid upper branches, and to place the candles in the proper position.

A is the main bar having a hooked extension A' provided with spurs $a$, $a'$, either secured to or struck up from the extension. I have shown in the present instance two spurs at the rear of the extension, so as to bite into the rear portion of the trunk of the tree as clearly shown in Fig. 3.

Pivoted to the main bar some distance from the extension is a bracket arm B, secured to the bar by a pivot pin $b$. This bracket arm is pointed at its extreme end so as to penetrate the front portion of the tree. The bar is hooked upon the tree, and the bracket adjusted to the position required, and a slight downward pressure is put upon the bar, so as to force the spurs $a$, $a'$, and the point of the bracket B into the tree. The device after adjustment will hold considerable weight.

Longitudinally adjustable on the bar A is an extension bar $A^2$ sliding in a sleeve $e$ on the bar A, and having at its inner end a sleeve $e'$ sliding upon the main bar. Carried by the extension bar is a candle holder D, provided in the present instance with a drip catcher $d$; thus the candle holder can be adjusted toward and from the trunk of the tree. In some instances I may mount the candle holder directly upon the main bar A, and dispense with the extension $A^2$, and as shown in Fig. 4, I may mount a series of candle holders upon the frame; some upon the main portion, and others upon the adjustable portion.

By the construction above described, I am enabled to make a candle holder for Christmas trees that can be readily applied to the trunk of the tree, and when applied will be perfectly rigid, and which can be adjusted to any point desired. The device can be readily removed from the tree, and packed into a small compass for future use.

I claim as my invention—

1. The combination of the frame A, a hooked portion A' thereof having spurs to engage with the trunk of the tree, a bracket arm pivoted to the frame, and pointed at its opposite end, with a candle receptacle at the outer end of the frame, substantially as described.

2. The combination of the frame A, having a hooked end A', spurs $a$, $a'$ on said hooked end, a bracket arm B pivoted to the frame, an extension $A^2$ adapted to slide upon the main frame A, with a candle receptacle carried by the extension, substantially as described.

In testimony whereof I have signed my name to this specification in the presence of two subscribing witnesses.

WILLIAM GRAU.

Witnesses:
WILLIAM D. CONNER,
HENRY HOWSON.